(12) United States Patent
Winter

(10) Patent No.: US 9,719,428 B2
(45) Date of Patent: Aug. 1, 2017

(54) GAS TURBINE ENGINE WITH PYLON MOUNTED ACCESSORY DRIVE

(75) Inventor: Michael Winter, New Haven, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1888 days.

(21) Appl. No.: 11/947,842

(22) Filed: Nov. 30, 2007

(65) Prior Publication Data

US 2009/0139243 A1 Jun. 4, 2009

(51) Int. Cl.
*F02C 6/00* (2006.01)
*F02C 7/32* (2006.01)
*F02C 7/36* (2006.01)
*F02K 3/06* (2006.01)

(52) U.S. Cl.
CPC . *F02C 7/32* (2013.01); *F02C 7/36* (2013.01); *F02K 3/06* (2013.01); *F05D 2260/4031* (2013.01); *Y02T 50/671* (2013.01)

(58) Field of Classification Search
CPC .............. F02C 7/20; F02C 7/32; F02C 7/36; F05D 2240/90; F05D 2260/30; F01D 25/28; B64D 27/26; B64D 27/262; B64D 27/264; B64D 27/266
USPC .................. 60/802, 796, 797, 798; 248/554; 244/54, 58
See application file for complete search history.

(56) References Cited

U.S. PATENT DOCUMENTS

| | | | |
|---|---|---|---|
| 2,803,943 A * | 8/1957 | Rainbow | 60/262 |
| 2,978,869 A * | 4/1961 | Hiscock et al. | 60/802 |
| 3,638,421 A | 2/1972 | Chilman | |
| 3,710,568 A | 1/1973 | Rice | |
| 3,722,214 A | 3/1973 | Guillot | |
| 3,830,058 A | 8/1974 | Ainsworth | |
| 3,907,220 A | 9/1975 | Amelio | |
| 4,055,041 A | 10/1977 | Adamson et al. | |
| 4,068,470 A * | 1/1978 | Sargisson et al. | 60/226.1 |
| 4,437,627 A * | 3/1984 | Moorehead | B64D 27/18 244/110 B |
| 4,449,680 A | 5/1984 | Gratzer et al. | |
| 4,476,395 A | 10/1984 | Cronin | |
| 4,525,995 A | 7/1985 | Clark | |
| 5,021,698 A | 6/1991 | Pullen et al. | |
| 5,103,631 A | 4/1992 | Edwards et al. | |
| 5,114,103 A | 5/1992 | Coffinberry | |
| 5,136,837 A | 8/1992 | Davison | |
| 5,143,329 A | 9/1992 | Coffinberry | |
| 5,174,110 A | 12/1992 | Duesler et al. | |
| 5,253,470 A | 10/1993 | Newton | |

(Continued)

FOREIGN PATENT DOCUMENTS

| | | |
|---|---|---|
| GB | 843359 | 8/1960 |
| WO | 9306007 | 4/1993 |

OTHER PUBLICATIONS

Machine Design article dated Nov. 5, 1998, "Gas Power Cycle-Jet Propulsion Technology, a Case Study."

(Continued)

*Primary Examiner* — Binh Q Tran
(74) *Attorney, Agent, or Firm* — Carlson, Gaskey & Olds P.C.

(57) ABSTRACT

A gas turbine engine includes an accessory gearbox within an engine pylon. The accessory components may be mounted within the engine pylon to save weight and space within the core nacelle as well as provide a relatively lower temperature operating environment.

15 Claims, 2 Drawing Sheets

(56) References Cited

U.S. PATENT DOCUMENTS

| | | | |
|---|---|---|---|
| 5,303,896 A | 4/1994 | Sterka | |
| 5,435,124 A | 7/1995 | Sadil et al. | |
| 5,555,722 A | 9/1996 | Mehr-Ayin et al. | |
| 5,687,561 A * | 11/1997 | Newton | B64D 41/007 60/226.1 |
| 5,694,765 A | 12/1997 | Hield et al. | |
| 6,179,249 B1 * | 1/2001 | Canadas | 244/53 R |
| 6,357,220 B1 * | 3/2002 | Snyder | F02C 7/32 60/223 |
| 6,360,989 B1 | 3/2002 | Maguire | |
| 6,725,542 B1 | 4/2004 | Maguire | |
| 6,735,954 B2 * | 5/2004 | MacFarlane et al. | 60/793 |
| 6,765,328 B2 | 7/2004 | Razzell et al. | |
| 6,825,640 B1 | 11/2004 | Hill et al. | |
| 6,865,891 B2 | 3/2005 | Walsh et al. | |
| 7,007,890 B2 | 3/2006 | Beutin et al. | |
| 7,010,906 B2 * | 3/2006 | Cazenave et al. | 60/226.1 |
| 7,055,330 B2 | 6/2006 | Miller | |
| 7,090,165 B2 | 8/2006 | Jones et al. | |
| 7,107,755 B2 | 9/2006 | El Hamel et al. | |
| 7,107,756 B2 | 9/2006 | Rolt | |
| 7,134,269 B2 | 11/2006 | Walsh et al. | |
| 7,160,159 B2 | 1/2007 | Webster | |
| 7,950,237 B2 | 5/2011 | Grabowski et al. | |
| 7,975,465 B2 * | 7/2011 | Morris | F02C 6/08 244/60 |
| 8,333,554 B2 * | 12/2012 | Chaudhry | F02C 7/32 415/122.1 |
| 9,022,318 B2 * | 5/2015 | Laude | B64D 27/18 244/53 R |
| 9,062,611 B2 * | 6/2015 | Sheridan | F02C 7/32 |
| 2005/0103931 A1 | 5/2005 | Morris et al. | |
| 2005/0183423 A1 | 8/2005 | Miller | |
| 2005/0183540 A1 | 8/2005 | Miller | |
| 2005/0483529 | 8/2005 | Miller | |
| 2006/0005547 A1 | 1/2006 | Brouillet | |
| 2008/0073460 A1 * | 3/2008 | Beardsley | B64D 27/26 244/54 |
| 2009/0067993 A1 | 3/2009 | Roberge et al. | |
| 2009/0139243 A1 | 6/2009 | Winter | |
| 2010/0139243 A1 | 6/2010 | Migliaro, Jr. | |

OTHER PUBLICATIONS

Zalud, Todd, machinedesign.com article dated Nov. 5, 1998, "Gears Put a New Spin on Turbofan Performance."

Hill, et al., Mechanics and Thermodynamics of Propulsion, Nov. 1970, third printing, pp. 307-308, Addison-Wesley Publishing Company, Inc., United States of America.

European Search Report received May 24, 2012.

* cited by examiner

GAS TURBINE ENGINE WITH PYLON MOUNTED ACCESSORY DRIVE

BACKGROUND OF THE INVENTION

The present invention relates to a gas turbine engine pylon arrangement.

Aircraft powered by gas turbine engines often include a mechanically driven accessory gearbox to drive accessory systems such as fuel pumps, scavenge pumps, electrical generators, hydraulic pumps, etc. The power requirements of the accessory gearbox continue to increase as the number of electrical systems within aircraft increase.

Conventional gas turbine engine accessory gearboxes utilize a separate gearbox case mountable underneath the engine axially near the diffuser case. The accessory gearbox is driven by an angle gearbox axially forward of the accessory gearbox through a layshaft. The angle gearbox is driven by a towershaft driven by the high-pressure spool.

Although effective, one disadvantage of this conventional arrangement is the utilization of a relatively significant amount of space within the engine core nacelle as well as the multiple shaft and gearbox arrangement required to transfer power from the towershaft to the independent accessory gearbox. To accommodate these design conditions, the nacelle design may provide less than optimal performance at cruise conditions.

Accordingly, it is desirable to provide an accessory gearbox for a gas turbine engine which provides power to larger generators than conventional engines, yet facilitates nacelle packaging.

SUMMARY OF THE INVENTION

The gas turbine engine according to one disclosed embodiment of the present invention locates an accessory gearbox within an engine pylon. The accessory gearbox includes a geartrain driven by at least one towershaft arrangement driven by the core engine. The towershaft arrangement extends through the core nacelle and the fan nacelle into the engine pylon. The geartrain facilitates direct drive of at least one accessory component to provide a more optimized core nacelle. The accessory components may be mounted within the engine pylon to save weight and space within the core nacelle and provide a relatively lower temperature operating environment which increases geartrain and accessory component life. This arrangement also frees up additional space within the core nacelle for other externals.

The present invention therefore provide an accessory gearbox for a gas turbine engine which provides power to larger generators than conventional engines, yet facilitates nacelle packaging.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
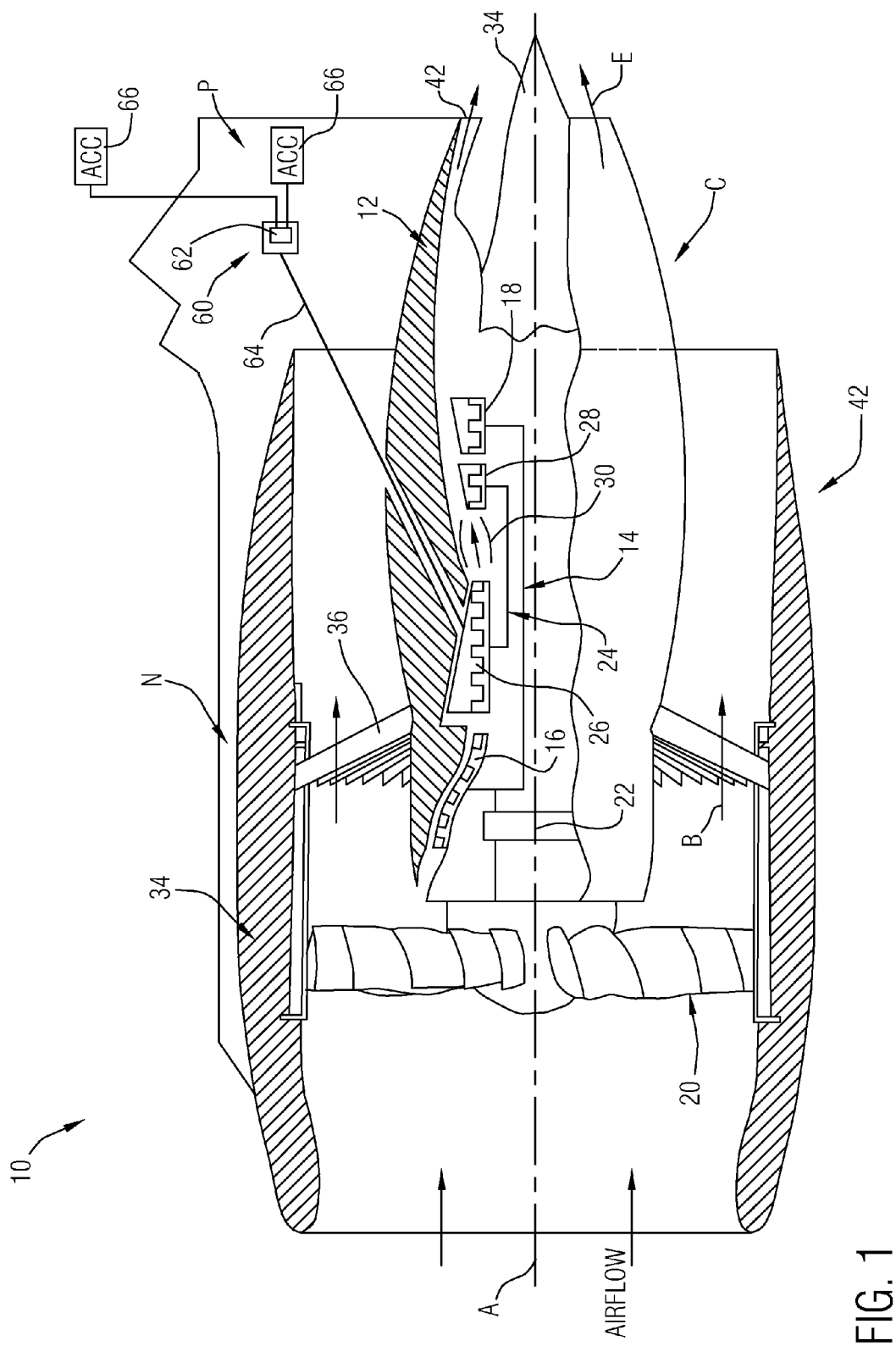
FIG. 1 is a general schematic sectional view through a gas turbine engine along the engine longitudinal axis.
Figure 2:
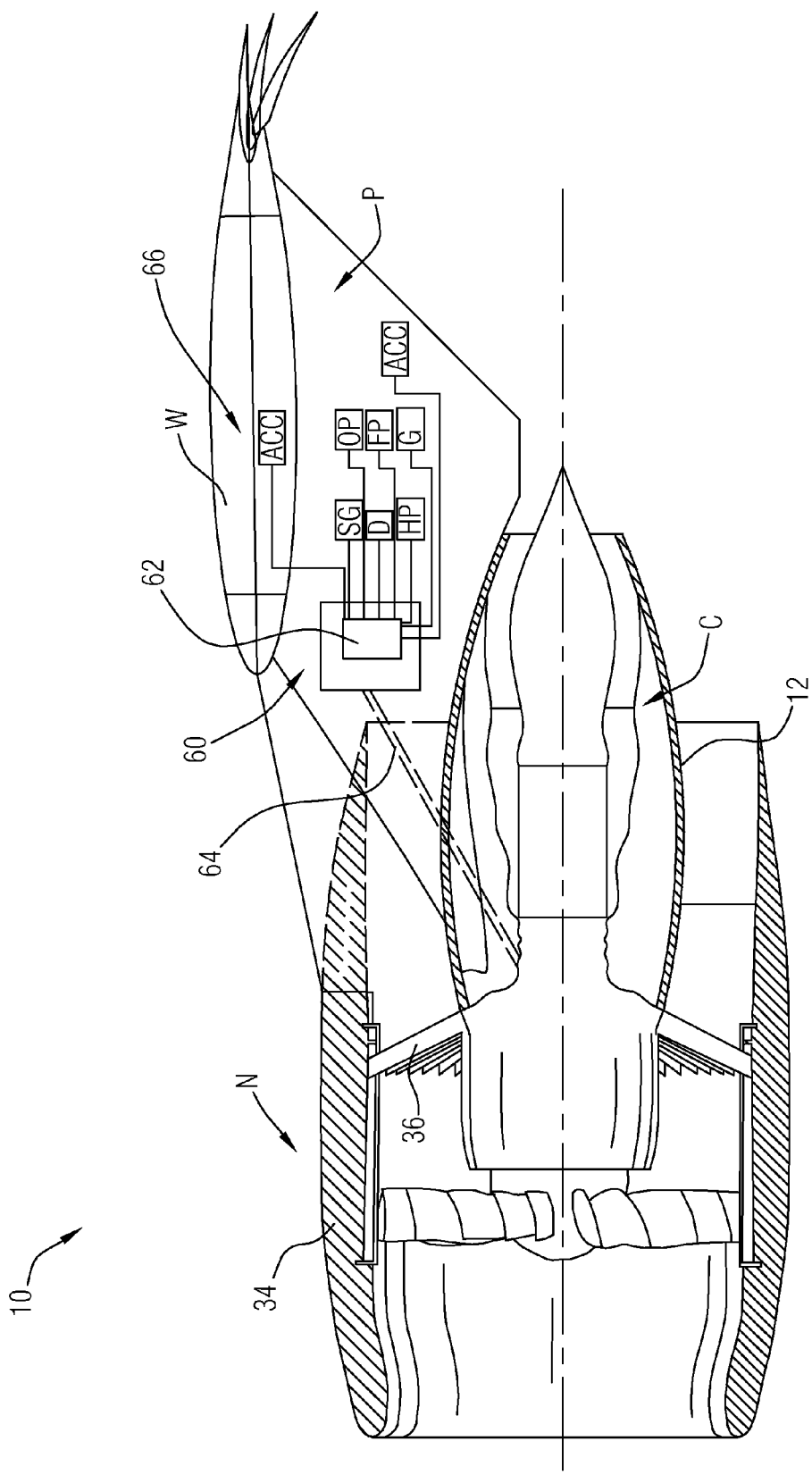
FIG. 2 is a general schematic view of pylon located accessory systems.

FIG. 1 illustrates a general partial fragmentary schematic view of a gas turbine engine 10 suspended from an engine pylon P within an engine nacelle assembly N as is typical of an aircraft designed for subsonic operation. The engine pylon P or other support structure is typically mounted to an aircraft wing W (FIG. 2), however, the engine pylon P may alternatively extend from other aircraft structure such as an aircraft empennage.

The turbofan engine 10 includes a core engine C within a core nacelle 12 that houses a low spool 14 and high spool 24. The low spool 14 includes a low pressure compressor 16 and low pressure turbine 18. The low spool 14 may drive a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed embodiment is a high-bypass geared architecture aircraft engine. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 22 may be an epicycle gear train such as a planetary gear system or other gear system with a gear reduction ratio of greater than 2.5:1. It should be understood, however, that the above parameters are only exemplary of one embodiment of a geared architecture engine and that the present invention is applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and, through the optional gear train 22, the fan section 20 in response to the expansion. A core engine exhaust E exits the core nacelle 12 through a core nozzle 42 defined between the core nacelle 12 and a tail cone 32.

The core nacelle 12 is at least partially supported within the fan nacelle 34 by structure 36 often generically referred to as Fan Exit Guide Vanes (FEGVs), upper bifurcations, lower bifurcations or such like. A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40.

An accessory gearbox 60 mounted within the engine pylon P includes a geartrain 62 driven by at least one towershaft arrangement 64 which takes power off of the core engine C. The towershaft arrangement 64 extends through either or both the core nacelle 12 and the fan nacelle 34 into the engine pylon P. The towershaft arrangement 64 may include a single towershaft which is in meshed engagement with either of the low spool 14 or the high spool 24.

Alternatively, the towershaft arrangement 64 may include two towershafts, one of each in meshed engagement with the respective low spool 14 and the high spool 24.

The accessory gearbox 60 supports the geartrain 62 to facilitate direct drive of at least one accessory component 66 and therefore provide a more optimized core nacelle 12. The geartrain 62 drives each auxiliary engine component at the proper speed. The geartrain 62 provides power to pumps, electrical generators and various other systems. The accessory components 66 may be mounted within the engine pylon P and include components such as a starter/generator SG, a deoiler D, a hydraulic pump HP, an oil pump OP, a fuel pump FP, a generator G and such like (FIG. 2) which thereby saves weight and space within the core nacelle 12. Location of the accessory components 66 within the pylon also provides a relatively lower temperature environment to thereby increase geartrain 62 and accessory component life.

It should be understood that any number and type of accessory components 66 are usable with the present invention. Furthermore, accessory components may alternatively, or in addition, be located in other areas such as in the wing W, core nacelle, fuselage, etc. Optimization of the core nacelle 12 increases the overall propulsion system efficiency to thereby, for example, compensate for the additional weight of the extended length towershaft. This arrangement also frees up additional space within the core nacelle below the engine case structure for other externals and accessory components.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An engine pylon assembly for a gas turbine engine comprising:
    an engine pylon;
    an accessory gearbox mounted within said engine pylon, said accessory gearbox including a geartrain, said accessory gearbox positioned aft of a fan nacelle of said gas turbine engine; and
    a multiple of accessory components mounted to said accessory gearbox, each of said multiple of accessory components driven by said geartrain; and
    at least one towershaft extending from said accessory gearbox through said engine pylon at a non-perpendicular angle relative to an engine axis of rotation.

2. The assembly as recited in claim 1, wherein said multiple of accessory components includes a starter/generator.
3. The assembly as recited in claim 1, wherein said multiple of accessory components includes a deoiler.
4. The assembly as recited in claim 1, wherein said multiple of accessory components includes a hydraulic pump.
5. The assembly as recited in claim 1, wherein said multiple of accessory components includes a fuel pump.
6. The assembly as recited in claim 1, wherein said multiple of accessory components includes a generator.
7. The assembly as recited in claim 2, wherein said multiple of accessory components includes a deoiler.
8. The assembly as recited in claim 7, wherein said multiple of accessory components includes a hydraulic pump.
9. The assembly as recited in claim 8, wherein said multiple of accessory components includes a fuel pump.
10. The assembly as recited in claim 9, wherein said multiple of accessory components includes a generator.
11. A gas turbine engine system comprising:
    a nacelle assembly including a core nacelle and a fan nacelle;
    an engine pylon;
    at least one towershaft driven by one of a low pressure spool and a high pressure spool, wherein said at least one towershaft extends at a non-perpendicular angle relative to an engine axis of rotation;
    an accessory gearbox mounted within said engine pylon, said accessory gearbox driven by said at least one towershaft and including a first geartrain, said accessory gearbox positioned aft of said fan nacelle;
    a multiple of accessory components mounted to said accessory gearbox, each of said multiple of accessory components driven by said first geartrain, said multiple of accessory components includes a starter/generator, a deoiler and a fuel pump mounted within said engine pylon;
    a fan; and
    a second geartrain, said low pressure spool driving said fan through said second geartrain.
12. The assembly as recited in claim 1, wherein said multiple of accessory components includes a starter/generator, a deoiler and a fuel pump mounted within said engine pylon.
13. The gas turbine engine as recited in claim 11, wherein said accessory gearbox is positioned aft of said fan nacelle relative to a normal operational attitude of the gas turbine engine.
14. The gas turbine engine as recited in claim 11, wherein said at least one towershaft includes a first towershaft and a second towershaft, wherein the first towershaft is driven by the low pressure spool and the second towershaft is driven by the high pressure spool.
15. The assembly as recited in claim 1, wherein said at least one towershaft includes a first towershaft and a second towershaft, wherein the first towershaft is driven by a low pressure spool of an engine and the second towershaft is driven by a high pressure spool of an engine.

* * * * *